(12) United States Patent
Puri et al.

(10) Patent No.: US 8,176,304 B2
(45) Date of Patent: May 8, 2012

(54) MECHANISM FOR PERFORMING FUNCTION LEVEL RESET IN AN I/O DEVICE

(75) Inventors: Rahoul Puri, Los Altos, CA (US);
Arvind Srinivasan, San Jose, CA (US);
Louise Y. Yeung, Palo Alto, CA (US);
Marcelino M. Dignum, Menlo Park, CA (US); John E. Watkins, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 711 days.

(21) Appl. No.: 12/256,250

(22) Filed: Oct. 22, 2008

(65) Prior Publication Data

US 2010/0100717 A1    Apr. 22, 2010

(51) Int. Cl.
*G06F 9/00* (2006.01)
*G06F 15/177* (2006.01)
*G06F 1/24* (2006.01)
*G06F 3/00* (2006.01)
*G06F 13/00* (2006.01)

(52) U.S. Cl. ............ 713/1; 713/2; 713/100; 710/1; 710/100

(58) Field of Classification Search .......... None
See application file for complete search history.

(56) References Cited

U.S. PATENT DOCUMENTS

| | | | |
|---|---|---|---|
| 6,601,165 B2 * | 7/2003 | Morrison et al. | 713/2 |
| 7,134,011 B2 * | 11/2006 | Fung | 713/100 |
| 2004/0098475 A1 * | 5/2004 | Zeitler et al. | 709/223 |
| 2004/0167996 A1 | 8/2004 | Takamura et al. | |
| 2004/0268114 A1 * | 12/2004 | Kobayashi | 713/2 |
| 2008/0276110 A1 * | 11/2008 | Indiani et al. | 713/330 |

OTHER PUBLICATIONS

U.S. Appl. No. 12/135,356, filed Jun. 9, 2008; Entitled: "System and Method for Discovering and Protecting Allocated Resources in a Shared Virtualized I/O Device" First named inventor: John E. Watkins.
U.S. Appl. No. 12/355,856, filed Jan. 19, 2009; Entitled: "Method and System for Reducing Address Space for Allocated Resources in a Shared Virtualized I/O Device" First named inventor: John E. Watkins.
U.S. Appl. No. 12/471,637, filed May 26, 2009; Entitled: "System and Method for Discovering and Protecting Shared Allocated Resources in a Shared Virtualized I/O Device" First named inventor: John E. Watkins.

* cited by examiner

*Primary Examiner* — Ji H Bae
(74) *Attorney, Agent, or Firm* — Meyertons, Hood, Kivlin, Kowert & Goetzel, P.C.; Stephen J. Curran

(57) ABSTRACT

An I/O device having function level reset functionality includes a host interface that may include a master reset unit, a plurality of client interfaces, each corresponding to one or more functions, and a plurality of hardware resources. Each hardware resource may be associated with a respective function. In response to receiving a reset request to reset a specific function, the master reset unit may provide to each client interface, a request signal corresponding to the reset request, and a signal identifying the specific function. Each client interface having an association with the specific function may initiate a reset operation of the associated hardware resources, and also provide a client reset done signal for the specific function to the master reset unit in response to completion of the reset operations of the hardware resources. The master reset unit provides a reset done signal for the specific function to the host interface.

6 Claims, 4 Drawing Sheets

MECHANISM FOR PERFORMING FUNCTION LEVEL RESET IN AN I/O DEVICE

BACKGROUND OF THE INVENTION

1. Field of the Invention

This invention relates to computer systems and, more particularly, to input/output (I/O) devices with shared I/O resources.

2. Description of the Related Art

There have been significant increases in the effective throughput of a variety of I/O devices used in computing systems. In the recent past, a number of new communication standards have been introduced. For example, 10 Gigabit Ethernet may allow up to ten gigabits of information to be conveyed and Peripheral Component Interconnect Express (PCIe™) Generation 1 may allow up to 2.5 Gbits per lane. In many computer systems, a single processor, processing module, or device typically does not use that much I/O bandwidth. Accordingly, in an effort to increase hardware resource utilization, sharing of the I/O hardware resources across multiple processing modules may be desirable.

One mechanism for sharing resources that use PCIe interfaces is to virtualize the resources across multiple processing elements. Thus, I/O virtualization standards have been introduced, such as for example, the single root and multi-root PCIe specifications. However, there are issues with virtualizing and sharing of some hardware resources. For example, an I/O device that implements a PCIe interface uses the notion of a function. Functions may be used to access respective hardware resources. However, for a variety of reasons, a function and its resources may need to be reset or reclaimed by the supervisory system software without perturbing the operation of any other function or process.

SUMMARY

Various embodiments of a I/O device having function level reset functionality are disclosed. In one embodiment, an input/output (I/O) device includes a host interface that may provide an I/O connection to a host device. The host interface may include a master reset unit, a plurality of client interfaces, each corresponding to one or more functions, and plurality of hardware resources. Each hardware resource may be associated with a respective function of the plurality of functions. In response to receiving from a given host device one or more reset requests such as function level reset (FLR) requests, to reset a specific function, the master reset unit may provide to each of the client interfaces, a request signal corresponding to the one or more reset requests, and a signal identifying the specific function. In addition, each client interface having an association with the specific function may initiate a reset operation of each of the associated hardware resources, and may provide a client reset done signal for the specific function to the master reset unit in response to completion of the reset operation of each of the associated hardware resources. Lastly, the master reset unit may provide a reset done signal for the specific function to the host interface.

Figure 1:
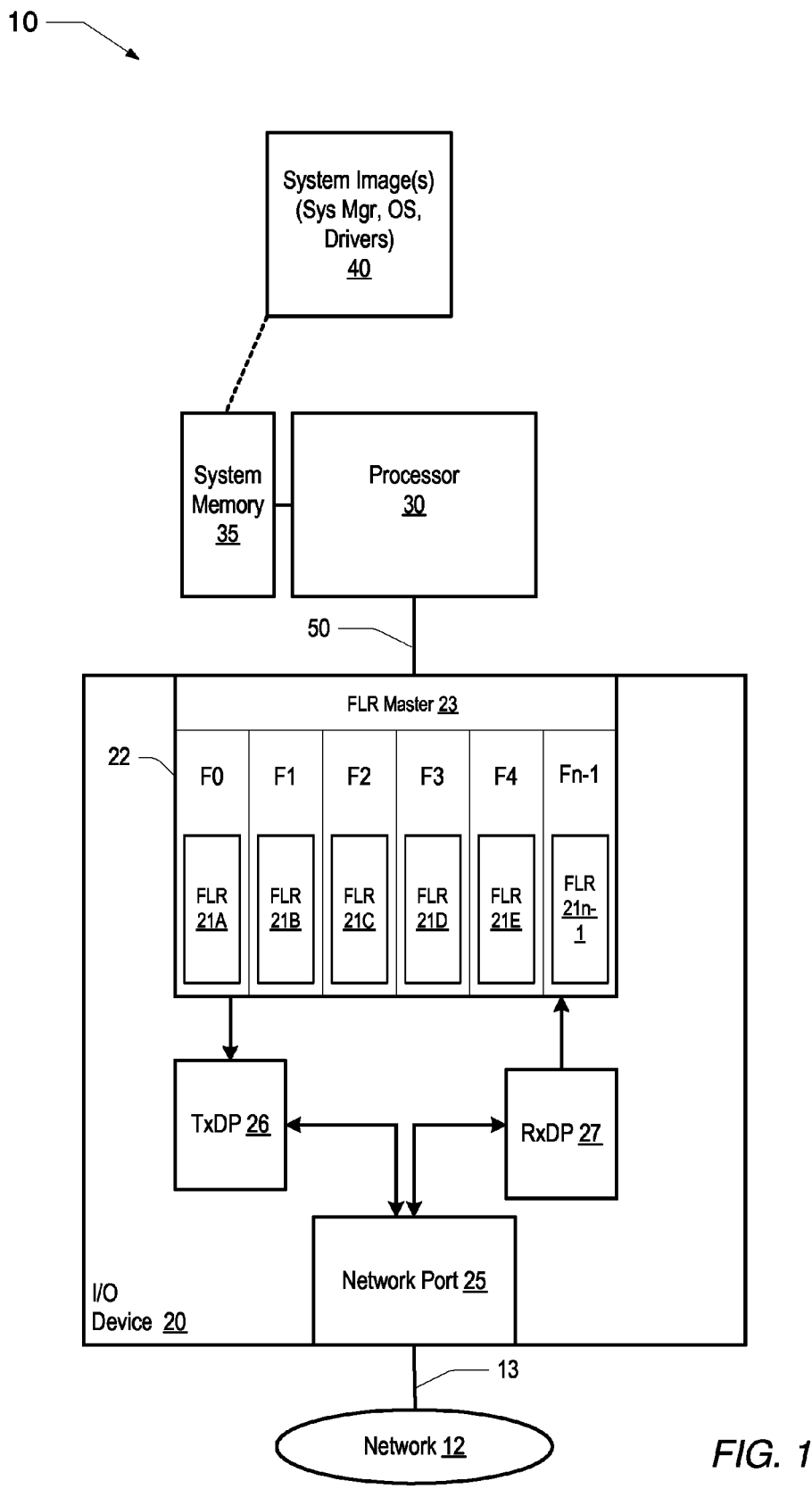
FIG. 1 is a block diagram of one embodiment of a computer system including a shared I/O device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

As mentioned above, there are issues with virtualizing and sharing of some hardware resources such as resetting a function and its resources without perturbing the operation of any other function or process, for example. As described further below, a relatively high cost hardware I/O device may be shared across a number of distinct processing entities. These processing entities could be running in a uni- or multi-operation system environment, with a varied number of user and system processes. In addition, using the I/O device described below, each function may not only be reset independently from each other function, but each hardware resource defined by the function may be hierarchically reset, such that a requesting process or device will be notified that the reset is done only after the entire function has been reset. In addition, multiple functions may be reset concurrently and in a non-blocking fashion.

Turning now to FIG. 1, a block diagram of one embodiment of a computer system 10 including an I/O device 20 connected to a network 12 is shown. Computer system 10 includes a processor 30. As shown, the processor 30 is coupled to the I/O device 20 via link 50. The I/O device 20 is coupled to a network 12. As shown, processor 30 is also coupled to a system memory 35.

In one embodiment, processor 30 may be representative of any type of processing unit including a single processor, a chip multiprocessor that includes multiple central processing units (CPUs) on a single substrate, or a processing node such as a blade processing unit or blade server, for example, which may include one or more CPUs in a single housing. It is noted that although processor 30 is shown coupled to the I/O device directly via link 50, it is contemplated that in other embodiments any number of processors such as processor 30 may be coupled through a separate root complex (not shown) which may be coupled via link 50 to I/O device 20.

System memory 35 may be representative of any type of memory medium. For example, in various embodiments, system memory 35 may be implemented using memory devices in the dynamic random access memory (DRAM) family of devices. However, system memory 35 may also be implemented using static RAM (SRAM) or other types of storage devices as desired. System memory 35 may be used to store program instructions, which may be fetched and executed by the processor 30.

More particularly, as shown in FIG. 1, one or more system images 40 may be stored within a respective system memory, as denoted by the dotted lines. Each of the system images may be representative of one or more instances of system software that may be running on a given CPU within the processor 30. For example, each system image may include an operating system instance, a device driver instance, as well as any other system level software executing on a processing unit. In addition, there may be several instances of a device driver executing on a given CPU. For example, as described in greater detail below, a CPU may be running several processes, each requiring I/O hardware resources within the I/O device 20.

In the illustrated embodiment, the I/O device 20 includes a network port 25 that is coupled to the network 12 via a network link.13. The I/O device 20 also includes a host interface 22. The host interface includes a number of hardware resources that are represented as functions F0, F1 through Fn−1, where n may be any number. In addition, the I/O device 20 includes a transmit data path designated TxDP 26 and a receive datapath designated RxDP 27. In various embodiments, the RxDP 27 may include filtering and classification, and scheduling functionality, among others. The TxDP 26 circuits may include arbitration and scheduling functionality. It is noted that I/O device 20 may also include a variety of other circuits that have been omitted here for simplicity. For example, in various embodiments, I/O device 20 may include, a bus interface (not shown) for connection to a service processor (also not shown).

The network port 25 may provide a connection to the network 12 using any of a variety of network protocols. In one embodiment, the network 12 may be any of a variety of frame-based Ethernet protocols. As such, the network connection may be a 10-Gigabit Ethernet (10GE) connection. Accordingly, network port 25 may be configured to provide a cable or optical interface, as well as other network functions such as medium access control (MAC) functions, physical (PHY) layer functions, and physical coding sublayer (PCS) functionality (all not shown). It is noted that in other embodiments, other network protocols may be supported.

In one embodiment, the functions of host interface 22 may include an I/O interface (not shown) that may be representative of a PCIe compliant physical interface, which may represent a PCIe endpoint for connection to the I/O link 50. As such, the link 50 may be a PCIe link that includes a number of lanes. In addition, the I/O interface may be independently configurable by the service processor or by one or more system images executing on processor 30. Further, each function of the host interface 22 may provide (i.e., be associated with) one or more of the hardware resources (e.g., MAC, statistics and control, DMA channels, PIO configuration space) that allow each processor 30 to substantially transparently share the network port 25. The I/O interface may be independently programmed and controlled by the processing unit 30 to which it is connected.

In one embodiment, an I/O device such as the I/O device 20, for example, needs to be identified by the O/S, enumerated within the overall I/O device tree constructed by the O/S, allocated memory space, granted a unique access identification, provided interrupt mechanisms, and allocated various other resources in order to efficiently bind the service provided by the device into the overall system. Accordingly, a function is a hardware construct consisting of a set of purpose-specific registers (not shown) built into an I/O device which standardizes the way a device presents its capabilities and resource requests to system software. Some of the registers may identify device capabilities and resource requests, while other registers may be used by S/W to allocate resources such as DMA resources, for example, to the device. Additional registers may provide status and error management tools. A function provides this information and control capability in a standardized way independent of the service provided by the I/O device. Some I/O devices may have as few as one function, while other devices may contain many functions, and may have a function allocated to each active system image sharing the device.

In one embodiment, the host interface 22 may support a number of functions (e.g., functions F0 through Fn−1), and each function may include a number of resources. The hardware resources may be divided up among the functions in an arbitrary manner. However, in one embodiment, each interface or I/O port may correspond to a respective function. As shown, in FIG. 1, the host interface 22 includes a function level reset (FLR) master unit 23. In addition, each function includes its own FLR logic (e.g., FLR 21A-21n−1) that may control receiving FLR requests and sending acknowledgements and FLR done signals. As described in greater detail below, each of the hardware resources within I/O device 20 may be associated with a client interface. The FLR master 23 may broadcast a received FLR request and the corresponding function number to all clients within the I/O device 20. In response, a client associated with the function being reset may cause each hardware resource or "subclient" in its hierarchy and with which it is associated to also reset in a hierarchical way. The client(s) being reset may respond whenever they and their subclients have completed their reset procedures.

Figure 2:
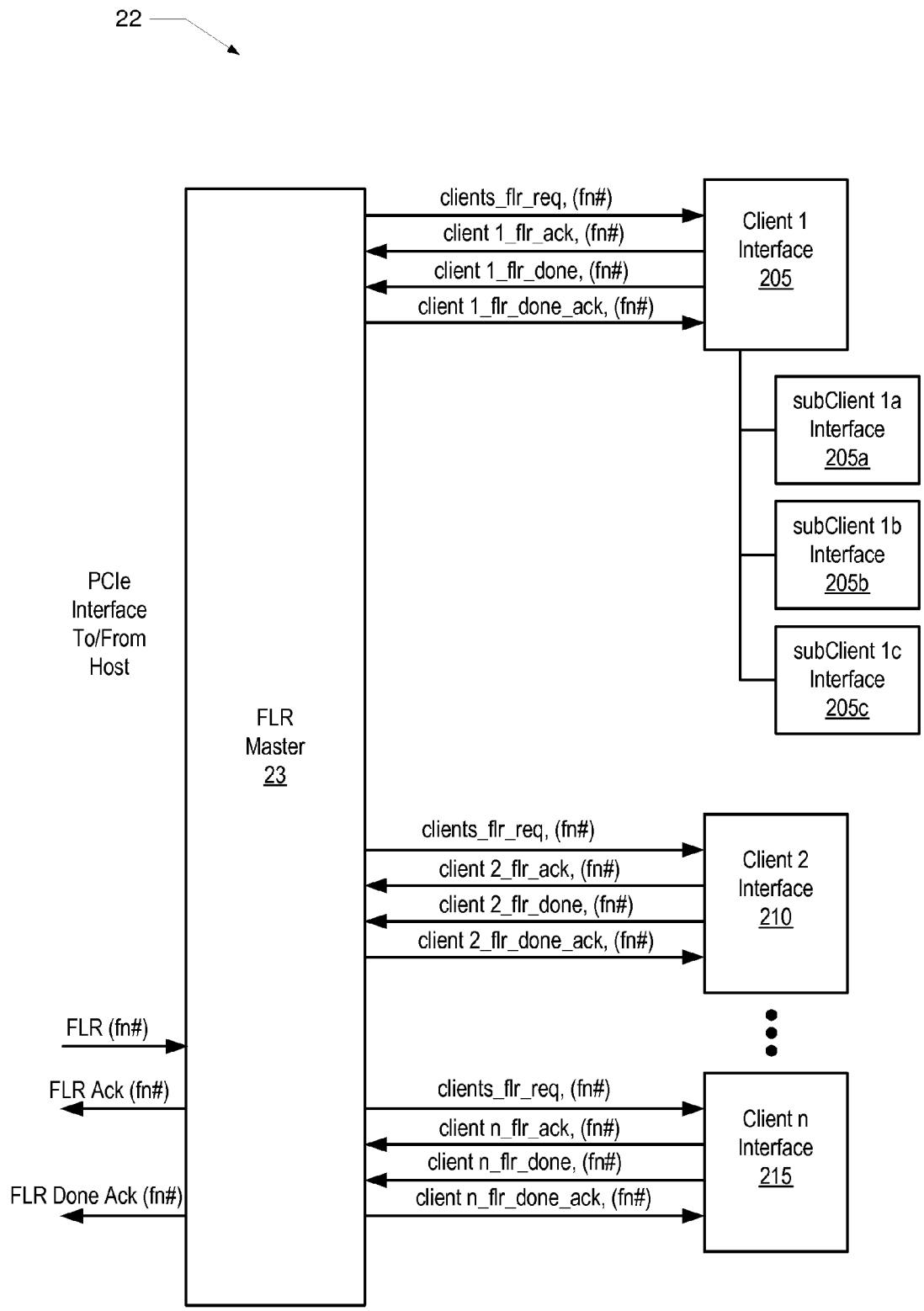
FIG. 2 is a block diagram illustrating an embodiment of the function level reset mechanism of the shared I/O device of FIG. 1.

Referring to FIG. 2, a block diagram illustrating more detailed aspects of an embodiment of the shared I/O device 20 of FIG. 1 is shown. The FLR master 23 is coupled to a number of client interfaces designated client 1 interface 205, client 2 interface 210, and client n interface 215, where n may be any number. In addition, client 1 interface 205 is coupled to a number of sub-client interfaces designated 205a, 205b, and 205c.

As shown, the FLR Master 23 is coupled to the host processor 30 via the PCIe link 50 and other interface logic (not shown) within the host interface 22, and may receive an FLR request (that includes the function number) from the host processor 30. In addition, the FLR master 23 may send FLR acknowledge (Ack) and FLR done signals back to the logic within the host interface 22 so that the host interface 22 may respond normally to requests made to functions that have completed the function level reset process.

The FLR master 23 may communicate various signals to each client interface. For example, as shown in FIG. 2, the FLR master 23 may send an FLR request signal that includes the function number designated clients_flr_req, (fn#), and an FLR done acknowledge and the corresponding function number, designated client#_flr_done_ack, (fn#). Similarly, the FLR master 23 may receive from each client an FLR acknowledge signal, designated client#_flr_ack, (fn#), and an FLR done signal, designated client#_flr_done, (fn#).

Figure 3:
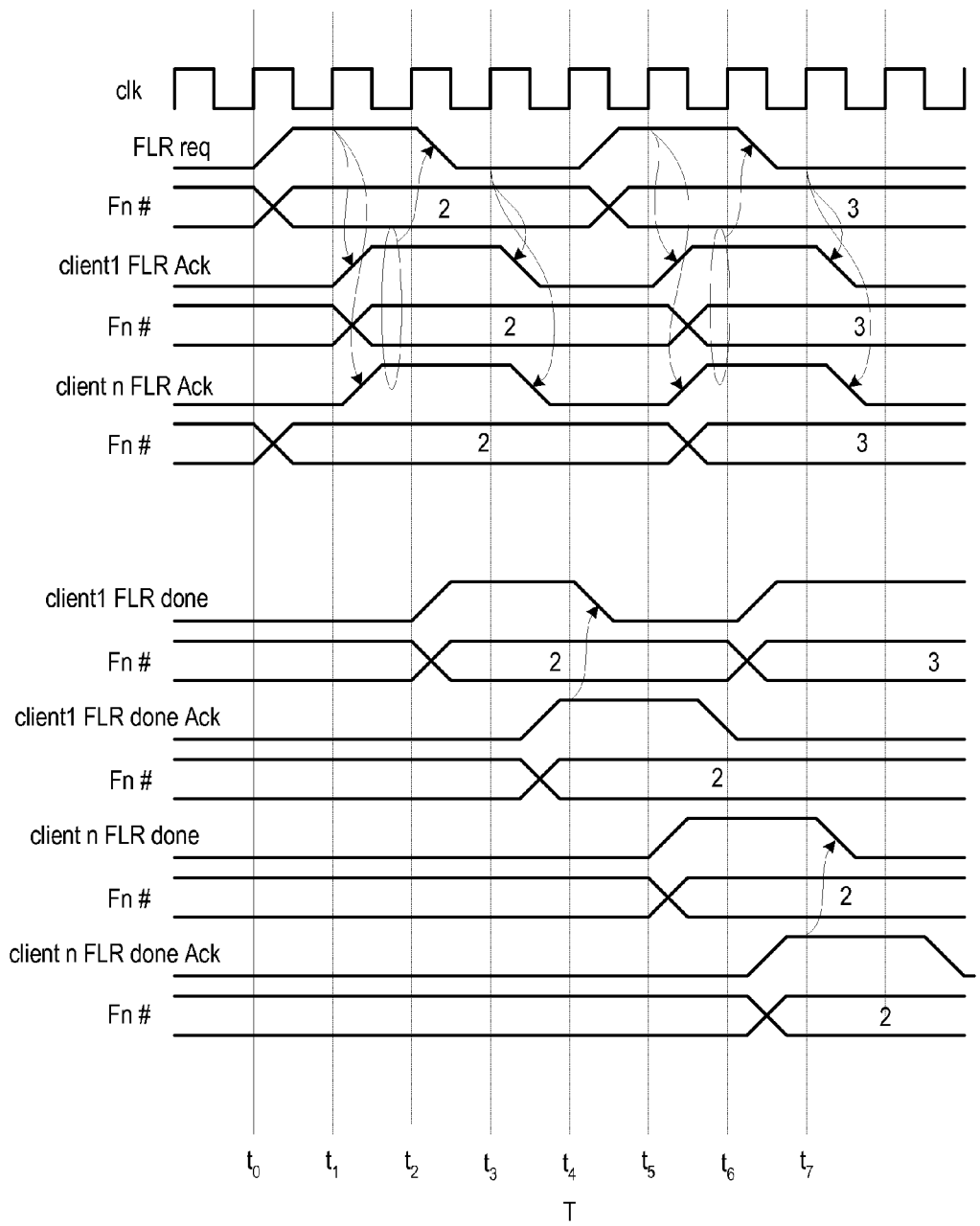
FIG. 3 is a timing diagram illustrating timing relationships between various signals used in the embodiments shown in FIG. 1 and FIG. 2.

As described further below, each client, upon receiving an FLR request that corresponds to the function number with which that client is associated, is configured to initiate a function level reset for all the hardware associated with that function. As such, the client may initiate the FLR request to each subclient in its hierarchy, and only report FLR done when all subclients have also completed the FLR. FIG. 3 is a timing diagram illustrating timing relationships between the various signals used in the embodiments of FIG. 1 and FIG. 2, and FIG. 4 is a flow diagram that describes the operation of the embodiments depicted FIG. 1 through FIG. 3

Figure 4:
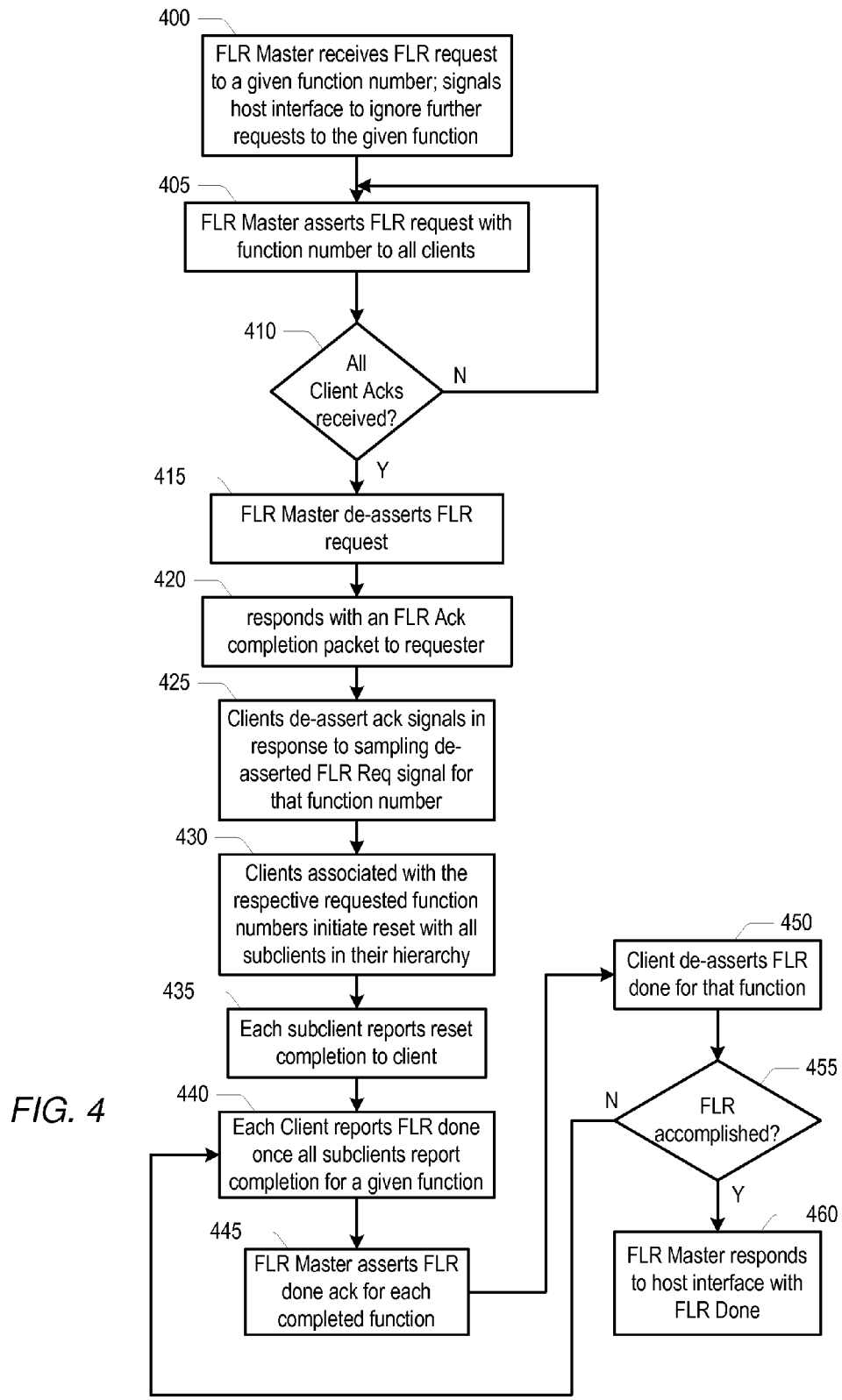
FIG. 4 is a flow diagram describing aspects of embodiments of the I/O device shown in FIG. 1 through FIG. 3.

Referring collectively to FIG. 1 through FIG. 4, and beginning in block 400 of FIG. 4, a host or other device initiates an FLR for a particular function. As such, the FLR master 23 receives an asserted FLR request signal and the associated function number. In one embodiment, the FLR master 23 broadcasts the request to all clients by asserting the clients-_flr_req signal, and by sending an encoded function number (block 405). In addition the FLR master 23 may signal the host interface 22 to ignore any requests directed to the function number being reset. In FIG. 3, the FLR req signal is asserted at t0. Likewise the function number Fn# signal is encoded with function number 2. Each client, after sampling the FLR request signal such as at time t1, will assert their respective client FLR ack signals on the next rising edge of the clock, as shown in FIG. 3. The FLR master 23 then waits for all clients to acknowledge the request. When the FLR master 23 has received the FLR ack signal from each client (block 410), the FLR master 23 de-asserts the FLR request signal at the next rising edge of the clk, as shown at time t2 (block 415).

In addition, in one embodiment, the FLR master 23 may send a non-posted completion write packet, which includes the function number that was targeted, to the requester via the corresponding PCIe link within a specified time from the request (block 420). In one embodiment, the FLR master may send the completion packet prior to receiving all client ack signals, if the FLR master 23 is capable of knowing that all ack signals will be sent.

Each client may de-assert its respective ack signals in response to sampling the de-asserted FLR request signal (block 425). For example, as shown shortly after time t3 in FIG. 3, the client ack signals are de-asserted.

The FLR master 23 now waits for the client(s) that is associated with the requested function to complete the reset operation. During the wait, the client initiates reset operations in any hardware that is associated with the requested function. For example, each client may initiate the function level reset in all subclients in its hierarchy that are associated with the requested function (block 430). The client may then wait for each hardware component to finish resetting. In one embodiment, multiple reset requests to different functions may be received and serviced concurrently. For example, the FLR master 23 may receive reset requests to multiple functions. In response, the FLR master 23 may issue the requests and the associated function numbers in a sequential (i.e., back-to-back) format. In response, each client may initiate reset operations in any hardware that is associated with the requested functions. In addition, each client is configured to control the reset operations so that they may occur concurrently and in a non-blocking fashion. Further, the reset operations may complete in a different order than the requests were received.

As each subclient finishes, it may report the completion to the client (block 435). Once the client receives an indication that all subclients, and thus all hardware associated with the function, have completed the reset, the client asserts an FLR done signal (block 440) to the FLR master 23, as shown in FIG. 3 at time t2. It is noted that in various embodiments, a client may complete the requested reset operations within one clock cycle of the client ack being asserted.

The FLR master 23 waits for all clients to report that the reset is done for a given function. More particularly, when all clients report an FLR done for a given function to the FLR master 23, the FLR master 23 may assert an FLR done ack signal (block 445). The client may de-assert its done signal once the client has sampled the done ack signal (block 450). For example, in FIG. 3, at t2 and t5, the clients assert client 1 FLR done, and client n FLR done signals. Then, between t3 and t4, the client 1 FLR done ack signal is asserted, which causes the client 1 FLR done signal to be de-asserted. Likewise for the client n FLR done signal, which is deasserted in response to the assertion of the client n FLR done ack signal between t6 and t7. If the client FLR done signals have been asserted for each function (block 455), the FLR master 23 may assert the FLR done signal along with the corresponding function number once the client FLR done signals have been asserted for each function (block 460), thus allowing the host interface 22 to respond normally to requests from the host processor 30 to the functions that were reset. Otherwise the FLR master 23 may continue to wait for all clients to report that the reset is done for a given function (block 440).

It is noted that FLR requests may come back to back for a given function. In one embodiment, the FLR master 23 may drop the second or subsequent requests for the same function number. However, back to back requests for different functions may be sequenced by the FLR master 23 such that the requests are spaced apart a sufficient number of clock cycles that allow the clients to handle the requests. It is also noted that a client may assert the FLR done signal for a given function in a different order than the requests were received. This may prevent a function that is slower resetting from blocking another function from completing, and thus multiple functions may be reset substantially simultaneously. The clients that share multiple functions may sequence the reset requests to the different functions. It is also noted that in one embodiment, the function level reset operation is a timed event, and as such should take some predetermined amount of time to fully execute. As such, the host interface 22 may, for that predetermined amount of time, ignore any requests made to a function that is currently being reset. After the predetermined amount of time, if the function level reset has not yet completed subsequent requests to that function may be met with a retry response. However, after some additional time limit a host processor or other requester may conclude that the particular function is non-responsive if the requester does not receive a normal response.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An input/output (I/O) device comprising:
  a host interface configured to provide an I/O connection to a host device, wherein the host interface includes:
    a master reset unit;
    a plurality of client interfaces, each corresponding to one or more functions;
    a plurality of hardware resources coupled to the host interface, wherein each hardware resource is associated with a respective function of the one or more functions;
  wherein in response to receiving from the host device one or more reset requests to reset a specific function, the master reset unit is configured to provide a request signal corresponding to the one or more reset requests, and a signal identifying the specific function, to each of the plurality of client interfaces;
  wherein each client interface having an association with the specific function is configured to initiate a reset operation of each of the associated hardware resources and to provide a client reset done signal for the specific function to the master reset unit in response to completion of the reset operation of each of the associated hardware resources;
  wherein the master reset unit is configured to provide a reset done signal for the specific function to the host interface; and wherein each client interface having an association with the specific function is further configured to provide a client acknowledge signal and a signal identifying the specific function to the master reset unit in response to receiving each of one or more reset requests.

2. An input/output (I/O) device comprising:
a host interface configured to provide an I/O connection to a host device, wherein the host interface includes:
  a master reset unit;
  a plurality of client interfaces, each corresponding to one or more functions;
  a plurality of hardware resources coupled to the host interface, wherein each hardware resource is associated with a respective function of the one or more functions;
wherein in response to receiving from the host device one or more reset requests to reset a specific function, the master reset unit is configured to provide a request signal corresponding to the one or more reset requests, and a signal identifying the specific function, to each of the plurality of client interfaces;
wherein each client interface having an association with the specific function is configured to initiate a reset operation of each of the associated hardware resources and to provide a client reset done signal for the specific function to the master reset unit in response to completion of the reset operation of each of the associated hardware resources;
wherein the master reset unit is configured to provide a reset done signal for the specific function to the host interface; and
wherein the master reset unit is further configured to provide a master done acknowledge signal and a signal identifying the specific function to each client that provided a client reset done signal to the master reset unit.

3. A system comprising:
a host device;
an input/output (I/O) device coupled to the host device via an I/O interconnect, wherein the I/O device includes:
  a host interface configured to provide an I/O connection for the I/O interconnect, wherein the host interface includes:
    a master reset unit;
    a plurality of client interfaces, each corresponding to one or more functions;
    a plurality of hardware resources coupled to the host interface, wherein each hardware resource is associated with a respective function of the one or more functions;
  wherein in response to receiving from the host device one or more reset requests to reset a specific function, the master reset unit is configured to provide a request signal corresponding to the one or more reset requests, and a signal identifying the specific function, to each of the plurality of client interfaces;
  wherein each client interface having an association with the specific function is configured to initiate a reset operation of each of the associated hardware resources and to provide a client reset done signal for the specific function to the master reset unit in response to completion of the reset operation of each of the associated hardware resources;
  wherein the master reset unit is configured to provide a reset done signal for the specific function to the host interface; and
  wherein each client interface is further configured to wait to send the client reset done signal to the master reset unit until each associated subclient interface completes reset operations initiated to each of the associated hardware resources.

4. A system comprising:
a host device;
an input/output (I/O) device coupled to the host device via an I/O interconnect, wherein the I/O device includes:
  a host interface configured to provide an I/O connection for the I/O interconnect, wherein the host interface includes:
    a master reset unit;
    a plurality of client interfaces, each corresponding to one or more functions;
    a plurality of hardware resources coupled to the host interface, wherein each hardware resource is associated with a respective function of the one or more functions;
  wherein in response to receiving from the host device one or more reset requests to reset a specific function, the master reset unit is configured to provide a request signal corresponding to the one or more reset requests, and a signal identifying the specific function, to each of the plurality of client interfaces;
  wherein each client interface having an association with the specific function is configured to initiate a reset operation of each of the associated hardware resources and to provide a client reset done signal for the specific function to the master reset unit in response to completion of the reset operation of each of the associated hardware resources;
  wherein the master reset unit is configured to provide a reset done signal for the specific function to the host interface; and
  wherein the master reset unit is configured to send a master reset acknowledge signal and the signal identifying the specific function to the host interface in response to receiving the reset request.

5. A method for resetting individual functions within an input/output (I/O) device, the method comprising:
receiving from a requester, a reset request for a specific function of a plurality of functions, wherein each function is associated with one or more respective hardware resources;
providing a request signal corresponding to the reset request, and providing a signal corresponding to the specific function, to each of a plurality of client interfaces, wherein each client interface corresponds to one or more of the plurality functions;
each client interface having an association with the specific function is configured to initiating a reset operation of each of the associated hardware resources, and providing a client reset done signal for the specific function in response to each of the associated hardware resources completing the reset operation;
providing a reset done signal for the specific function; and
providing a master done acknowledge signal and a signal identifying the specific function to each client that provided a client reset done signal.

6. A method for resetting individual functions within an input/output (I/O) device, the method comprising:
receiving from a requester, a reset request for a specific function of a plurality of functions, wherein each function is associated with one or more respective hardware resources;

providing a request signal corresponding to the reset request, and providing a signal corresponding to the specific function, to each of a plurality of client interfaces, wherein each client interface corresponds to one or more of the plurality functions;

each client interface having an association with the specific function is configured to initiating a reset operation of each of the associated hardware resources, and providing a client reset done signal for the specific function in response to each of the associated hardware resources completing the reset operation;

providing a reset done signal for the specific function; and each client interface waiting to send the client reset done signal until each associated subclient completes reset operations initiated to each of the associated hardware resources.

\* \* \* \* \*